United States Patent
Carney

(10) Patent No.: US 8,769,781 B2
(45) Date of Patent: Jul. 8, 2014

(54) SHOWER CADDY CLIP AND SLEEVE

(75) Inventor: John R. Carney, Bentleyville, OH (US)

(73) Assignee: InterDesign, Inc., Solon, OH (US)

(*) Notice: Subject to any disclaimer, the term of this patent is extended or adjusted under 35 U.S.C. 154(b) by 52 days.

(21) Appl. No.: 13/328,606

(22) Filed: Dec. 16, 2011

(65) Prior Publication Data

US 2012/0159748 A1  Jun. 28, 2012

Related U.S. Application Data

(60) Provisional application No. 61/460,030, filed on Dec. 22, 2010.

(51) Int. Cl.
 A44B 99/00 (2010.01)
 F16B 2/20 (2006.01)

(52) U.S. Cl.
 USPC ............... 24/457; 24/560; 24/546; 248/214; 248/230.7

(58) Field of Classification Search
 USPC ............... 248/682, 693, 212, 213, 214, 215, 248/230.1, 230.7, 304; 24/457, 545, 557, 24/560, 566, 530, 549, 462, 910, 326, 327, 24/335, 336, 339, 341, 546; 211/119, 211/119.009
 See application file for complete search history.

(56) References Cited

U.S. PATENT DOCUMENTS

| | | | | |
|---|---|---|---|---|
| 1,387,363 A * | 8/1921 | De Fore | | 248/212 |
| 1,594,195 A * | 7/1926 | Henderson | | 47/47 |
| 1,684,721 A * | 9/1928 | Wood | | 24/501 |
| 1,865,453 A * | 7/1932 | Baltzley | | 24/545 |
| 2,413,772 A * | 1/1947 | Morehouse | | 24/457 |
| 2,500,677 A * | 3/1950 | Harris | | 24/557 |
| 2,894,773 A * | 7/1959 | Noe | | 403/385 |
| 3,181,702 A * | 5/1965 | Raphaei | | 211/119 |
| 3,350,754 A * | 11/1967 | Ballenger et al. | | 24/457 |
| 3,923,162 A * | 12/1975 | Hussey | | 211/119 |
| 4,382,531 A * | 5/1983 | Bisk et al. | | 223/91 |
| 4,696,081 A * | 9/1987 | Yen | | 24/558 |
| 4,701,983 A * | 10/1987 | Warmath | | 24/511 |
| 4,750,697 A * | 6/1988 | Tontarelli | | 248/215 |
| 4,878,276 A * | 11/1989 | Morrish et al. | | 24/511 |
| 5,182,827 A * | 2/1993 | Carrier et al. | | 5/498 |
| 5,241,728 A * | 9/1993 | Hunter | | 24/511 |
| 5,402,558 A * | 4/1995 | Santapa | | 24/511 |
| 5,950,283 A * | 9/1999 | Sato | | 24/67 R |
| 2004/0206868 A1 * | 10/2004 | Kaufman | | 248/214 |
| 2009/0301777 A1 * | 12/2009 | Yribarren | | 174/99 R |

* cited by examiner

*Primary Examiner* — Robert J Sandy
*Assistant Examiner* — Abigail Morrell
(74) *Attorney, Agent, or Firm* — Calfee, Halter & Griswold LLP

(57) ABSTRACT

A retaining device for retaining a shower caddy or other item on a shower arm or other elongated member includes a clip structure for partially surrounding the shower arm or elongated member and having retaining arms extending therefrom and a plastic sleeve structure having receptacles for receiving the retaining arms to hold the sleeve structure on the clip structure, and a shower-arm engaging portion or elongated member engaging portion for engaging the shower arm or elongated member to render the shower caddy or other item immobile on the shower arm or elongated member.

8 Claims, 5 Drawing Sheets

SHOWER CADDY CLIP AND SLEEVE

CROSS-REFERENCE TO RELATED APPLICATION

This application claims priority of U.S. Provisional Application No. 61/460,030 filed Dec. 22, 2010.

BACKGROUND OF THE INVENTION

1. Field of the Invention

This invention relates to a device for attachment to an elongated member, especially an apparatus for securing a shower caddy to a shower arm to which a showerhead is attached, and more particularly to a clip structure and sleeve structure for securely but removably attaching a device such the shower caddy to an elongated member such as a shower arm.

2. Description of the Prior Art

Many shower caddies are known having a metal rack with a back piece having an upper loop for extending over a shower arm to hold the shower caddy in place, with the shelves and other components of the shower caddy accessible beneath the shower arm. However, the portion of the prior art devices for holding the shower caddy to the shower arm are ineffective for a number of reasons. If the metal device itself engages the shower arm, it is likely to slip off the shower arm or cause the shower caddy to swing on the shower arm, making the shower caddy unstable and often ineffective since devices held on the shower caddy can fall to the floor, tip over, have their contents spill out or to have the entire shower caddy fall off the shower arm. In other instances the shower caddy has a narrow upper loop for extending over the shower arm, the loop being generally semi-circular for engaging the shower arm in a fairly tight manner. Sometimes the foregoing loop can be attached into a larger loop of the shower caddy and may be less noticeable since its primary purpose is often to keep the shower caddy steady while the main loop applies the weight of the shower caddy and its contents to the shower arm. Even in this situation, the shower caddy is likely to swing about the shower arm when it or its contents are touched by a person, and this could not only make possible the tipping over of jars and other equipment held in the shower caddy but also could cause scratching of the shower arm by the loop.

Efforts have been made to enable the engagement of the relatively narrow loop with the shower arm in a manner which both protects the shower arm from being scratched by the loop and to hold the shower caddy in place. This has involved making the loop of relatively thin wire having open ends and providing a tubular cover for the loop made of plastic. The plastic is intended to tightly grip the shower arm since the plastic is flexible and can fit tightly over the shower arm to both prevent the swaying of the shower caddy and to protect the shower arm from being scratched or otherwise marred. However, even this supposed solution was not effective. The loop had to be long enough to substantially surround the shower arm, and this made the threading of the loop across the shower arm difficult due to the friction between the metal loop, the interior of the plastic tube and to the limited flexibility of the tube. Since shower caddies are made in large numbers, a simple and fast requirement for putting the loop protector in place was required. One possible solution had been to provide a plastic tube with a longitudinal slit running along the edge of the tube (longitudinal means running parallel to the longitudinal axis of the tube, even though the tube in many instances would be curved). However, in practice it was found that such loops slipped off of the loop. This is particularly true in those cases where the clip had straight portions near its ends onto which the loop was inserted. The protective loop can be slipped off the shower caddy during handling of the shower caddy at the factory where it is being made, during handling when the shower caddies are packed for shipment from a factory to the customer, and by a user of the shower caddy.

Although the present invention relates primarily to shower caddies being mounted on shower arms, the present invention could be used to attach any item to be suspended from or otherwise supported on an elongated member. The elongated member could be a cylinder, but it could also have other cross sections with various perimeters such as hexagonal, octagonal, oval, regular or irregular perimeters, etc.

SUMMARY OF THE INVENTION

An object of the invention is to provide a device for securely but removably suspending a structure from a shower arm or the like.

Another object of the present invention is to provide the device for securely enabling the attachment of a shower caddy or the like to a shower arm or the like which can be effected over the showerhead connected to the shower arm, which prevents the inadvertent tilting or removal of the shower caddy or the like on or from the shower arm or the like.

It is still a further object of the present invention to provide a retaining device for tightly and removably hanging a shower caddy from a shower arm which prevents the inadvertent tilting or removal of the shower caddy on or from the shower arm to prevent both slippage and overturning of objects held by the shower caddy, to prevent marring of the shower arm and to prevent the slippage of the shower caddy from the shower arm.

It is yet still a further object of the present invention to provide a clip structure for use with a shower caddy which at least partially surrounds a shower arm to removably secure the shower caddy to the shower arm, and a sleeve structure for being attached to the clip structure in a fast manner, which cover cannot be inadvertently removed from the clip.

Another object of the present invention is to provide a clip structure for a shower caddy with a sleeve structure which can easily and effectively be applied to the clip for bulk production in a fast and effective manner.

Another general object is to provide a device for enabling the secure attachment of an item to an elongated member having a variety of cross sections.

Other objects of the present invention will appear from the description to follow and from the appended claims.

The foregoing objects are achieved according to the preferred embodiment of the invention by means of a clip structure which is secured to a loop larger than the clip structure for being applied over a shower arm with a showerhead in place, the clip structure being made of metal wire having an inverted U-shaped portion for going over the top of the shower arm and having retaining arms in the form of lower linear portions facing forwardly. A sleeve structure comprising a shower-arm engaging portion in the form of a ribbon-like body portion with holding structure or integral receptacles in the form of end tubes at its opposite ends which can be bent so that the opposite tubes can be slipped over the parallel arms of the clip structure in a fast manner. In operation, the ribbon-like body engages the shower arm in a firm manner for preventing the swinging of the shower caddy about the shower arm or removal of the shower caddy from the shower arm, with the tubes of the sleeve structure firmly engaging the retaining arms to prevent the inadvertent removal of the sleeve structure from the clip structure.

DESCRIPTION OF THE PREFERRED EMBODIMENT

Figure 1:
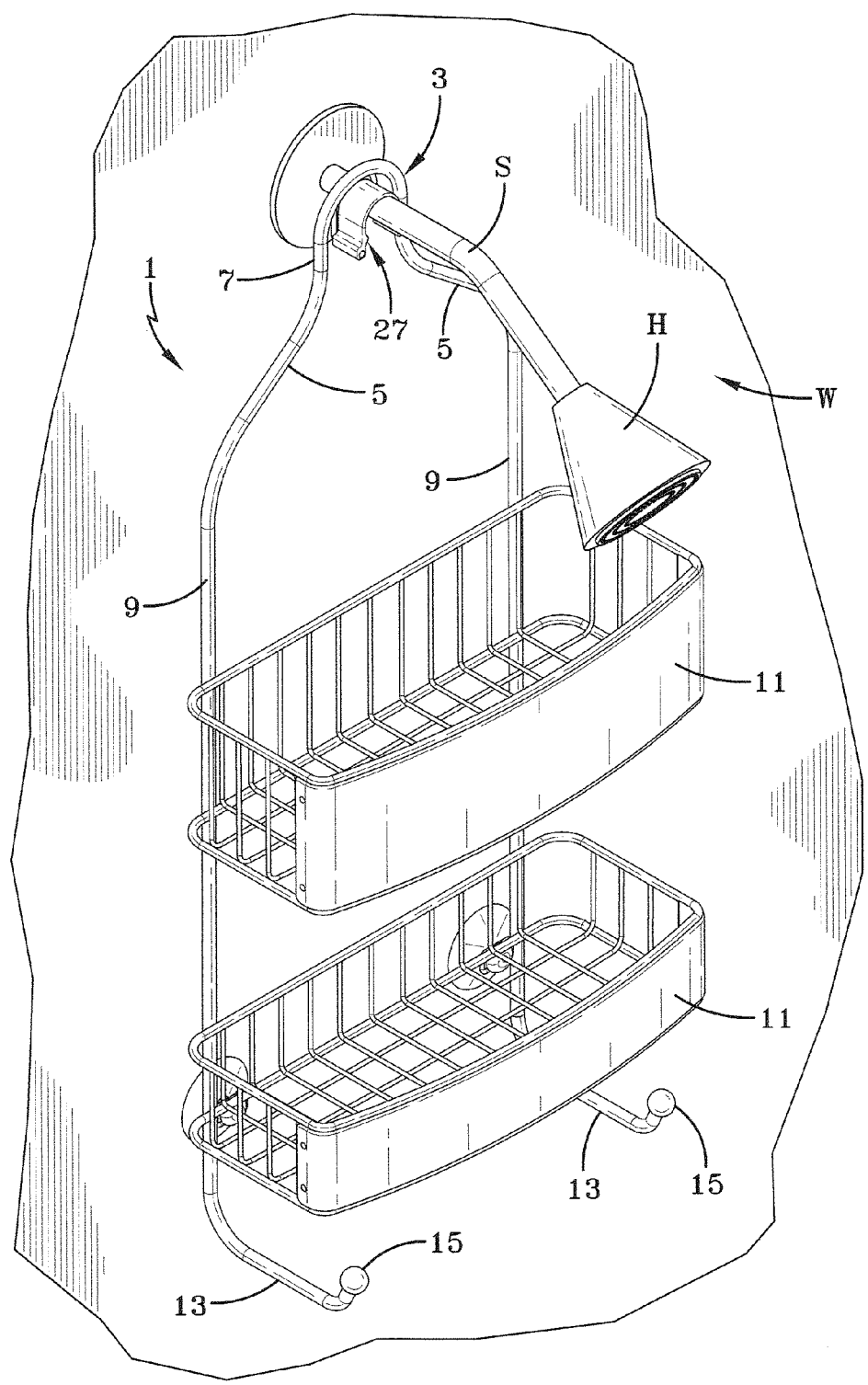
FIG. 1 is a perspective view of a shower caddy incorporating the invention hung on the shower arm.
Figure 5:
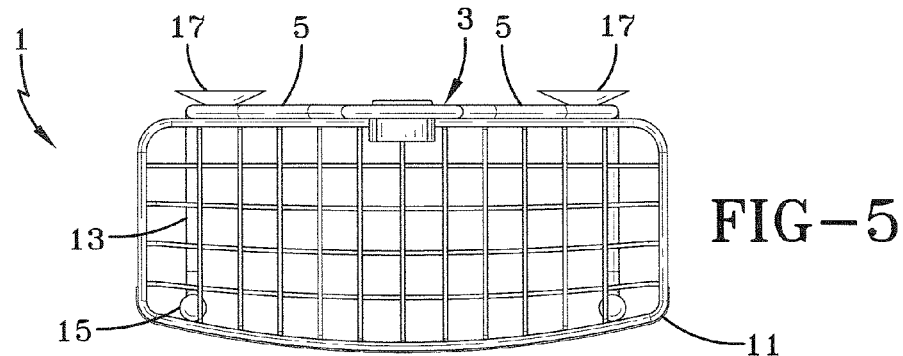
FIG. 5 is a top view of the shower caddy including the clip structure and sleeve structure as shown in FIG. 2.
Figure 2:
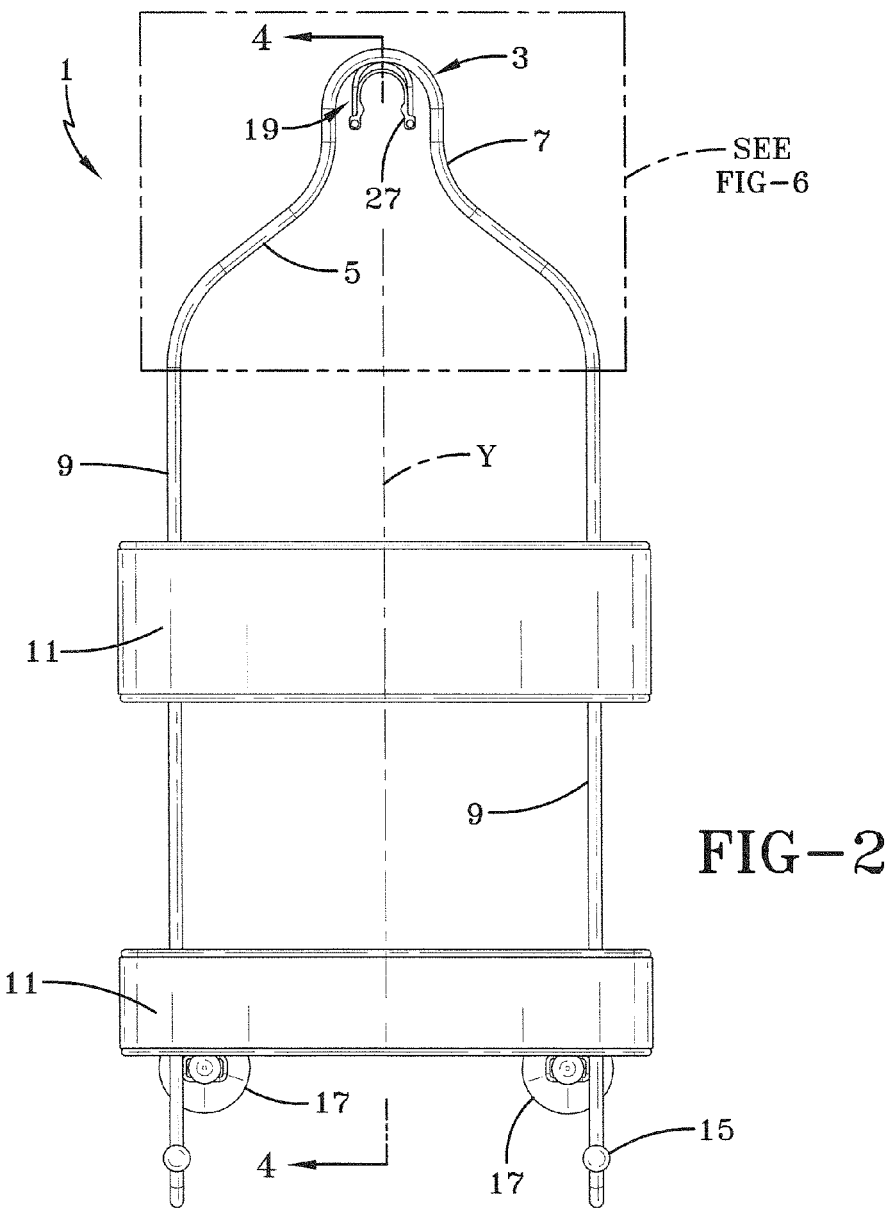
FIG. 2 is a front view of a shower caddy including the clip structure and sleeve structure according to the invention.
Figures 3, 4:
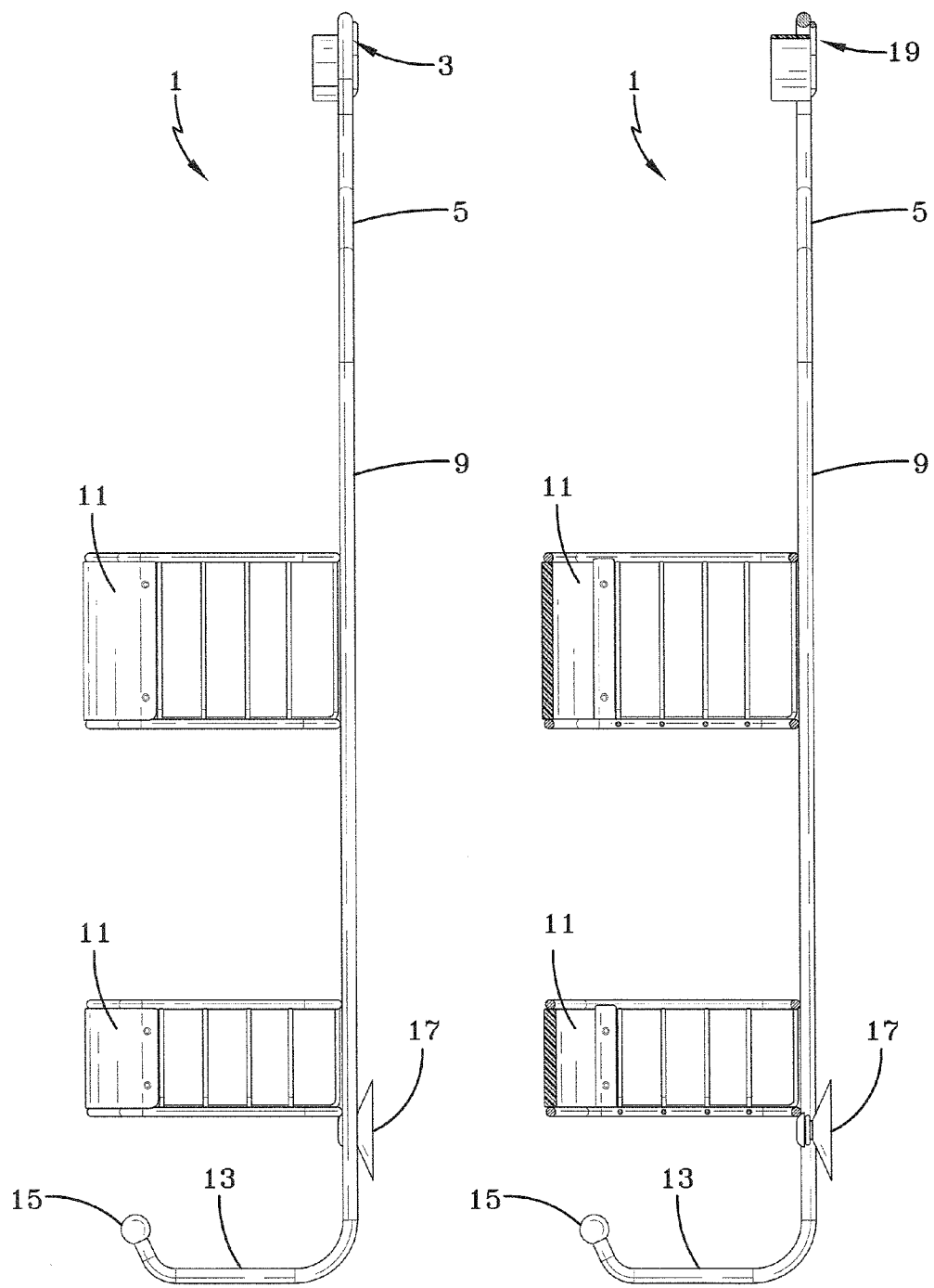
FIG. 3 is a side view of the shower caddy with the clip structure and sleeve structure as shown in FIG. 2.
FIG. 4 is a cross section of the shower caddy including the clip structure and sleeve structure as shown in FIG. 3.
Figure 6:
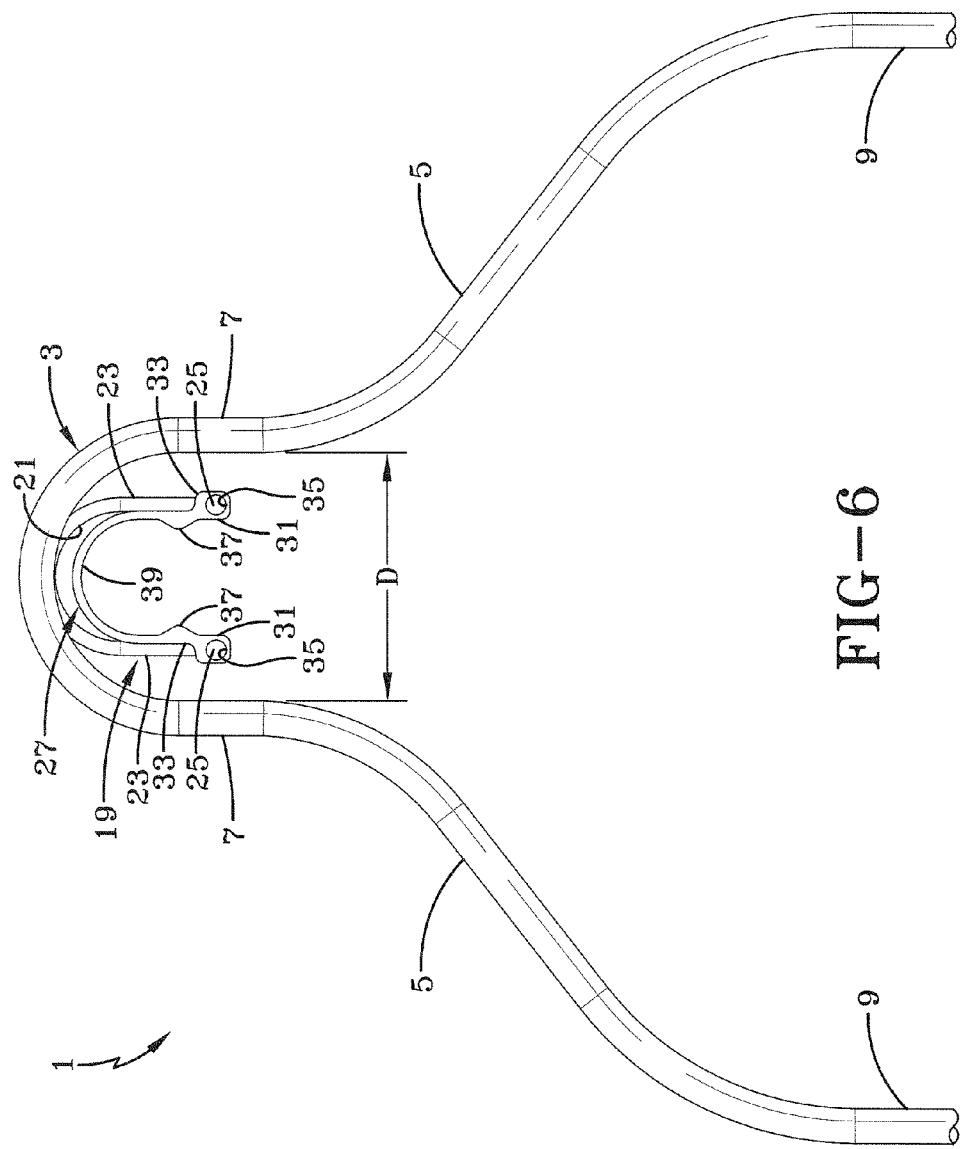
FIG. 6 is an enlarged view of the upper portion of the shower caddy including the clip structure and the sleeve structure as shown in FIG. 2.
Figure 7:
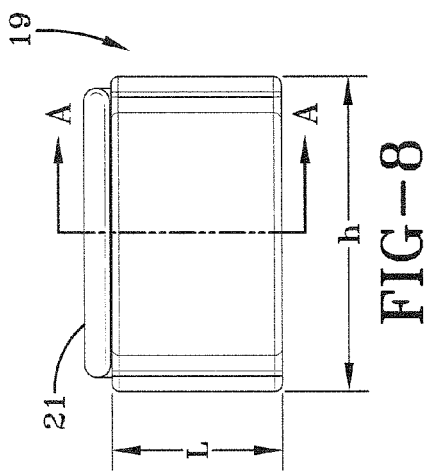
FIG. 7 is a front view of a clip structure and sleeve structure which are incorporated in the shower caddy shown in FIGS. 1-6.

FIGS. 1-5 show a shower caddy 1 hung on a shower arm S. Shower arm S protrudes from a wall W and has a showerhead H mounted on its free end. Shower caddy 1 has a support portion 3 which is in the form of an inverted U having a pair of opposed loop arms 7 with a relatively large internal diameter D as shown in FIG. 6. Depending from support portion 3 are a pair of transition arms 5 which are integral with each of loop arms 7 of support portion 3. Transition arms 5 are integral with a pair of opposed parallel straight arms 9 of shower caddy 1. Arms 9 support one or more baskets or trays 11. In shower caddy 1 as shown, extending at about 90° from the portion of straight arms 9 at the opposite portion thereof from support portion 3 are a pair of straight members 13 having end portions 15 which are bent towards support portion 3 to form a pair of arms from which items can be hung. A pair of suction cups 17 are disposed beneath the lowest of shelves 11 for retaining shower caddy 1 against wall W beneath shower arm S The inverted U of support portion 3 is symmetrical about an axis Y as shown in FIG. 2. A clip structure 19, also in the form of an inverted U, is attached to support portion 3 between loop arms 7 of support portion 3 and positioned to share axis Y with support portion 3. Clip structure 19 is shown more clearly in FIGS. 6-11. Clip structure 19 is composed of a curved portion 21 from which extend opposed parallel arms 23 which are parallel with straight arms 9 of shower caddy 1. Curved portion 21 has an inside diameter d as shown in FIG. 7. Bent at about 90° from the end of parallel arms 23 opposite curved portion 21 are a pair of opposed retaining arms 25. Retaining arms need not be at 90° from parallel arms 23 and can be transverse thereto. Curved portion 21 and parallel arms 23 fall generally in a plane, and retaining arms 25 are perpendicular to that plane. Curved portion 21, parallel arms 23 and retaining arms 25 are preferably made from a uniform cylindrical wire having the same diameter throughout, which is preferably smaller than the wire of which support portion 3 is composed so as to make clip structure 19 less noticeable when in use. Furthermore, since clip structure 19 has a relatively small inside diameter, it can be bent inwardly to reduce its diameter d or bent outwardly to increase its diameter d. As explained below, clip structure 19 can be slipped over a shower arm S, and clip structure 19 can be manually squeezed to reduce inner diameter d or moved apart to increase diameter d so as to enable clip structure 19 to tightly engage shower arms having various outer diameters.

Attached to clip structure 19 is a sleeve structure 27. Sleeve structure 27 is preferably made from PVC, polyurethane or similar plastic and is a unitary, one-piece member comprised of a generally curved portion composed of inner layers 31 and opposing outer layers 33. Inner layers 31 and outer layers 33 form a pair of opposing receptacles in the form of parallel hollow tubes 35 which can be separated from each other by a distance to enable each of them to receive or slip onto one of the retaining arms 25 of clip structure 19. Inner layers 31 and outer layers 33 are respectively separated from each other so that they can each receive one of the retaining arms 25 in a sliding engagement. Inner layers 31 are formed to protrude towards each other near the respective tubes 35 at opposing protrusions 37. Opposing protrusions 37 combine with an inner surface 39 of sleeve structure 27 to expand the portion of sleeve structure 27 which engages the outer surface of a shower arm S to enhance the holding power of clip structure 19 and sleeve structure 27 on shower arm S. As noted earlier, opposing parallel arms 23 of clip structure 19 can be bent towards each other to increase the holding force of clip structure 19 and sleeve structure 27 on shower arm S.

One of the features of clip structure 19 and sleeve structure 27 which is not found in the prior art is the ability of sleeve structure 27 to remain on clip structure 19 by virtue of the gripping of retainer arms 25 by the surfaces of sleeve structure 27 forming tubes 35 which engage retaining arms 25. The latter holding force is very effective and remains in effect to keep sleeve structure 27 on clip structure 19 from as soon as sleeve structure 27 is installed on clip structure 19, regardless of the handling procedures which ensue during the completion of the manufacturing process for shower caddy 1, the packing and shipping of shower caddy 1, and regardless of the amount of times that shower caddy 1 is placed upon and removed from shower arms S.

Figure 8:
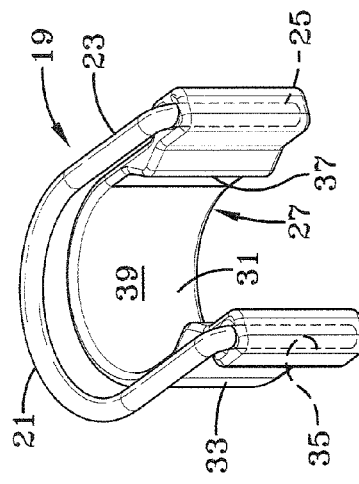
FIG. 8 is a top view of a clip structure and sleeve structure shown in FIG. 7.
Figure 11:
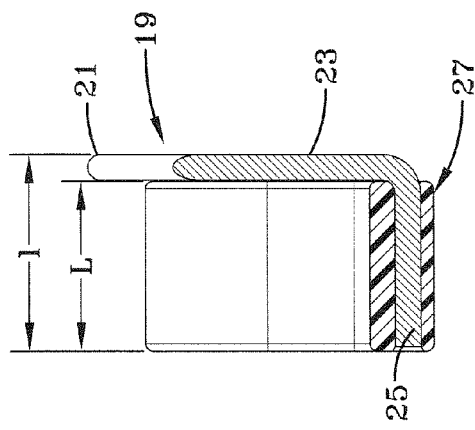
FIG. 11 is a perspective view of the clip structure and sleeve shown in FIGS. 1-10.
Figure 10:
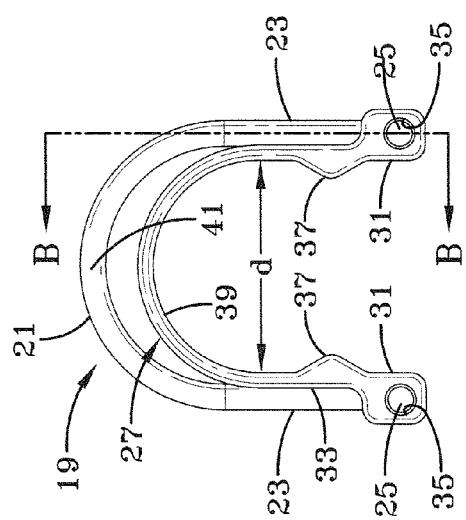
FIG. 10 is a view taken in the direction B-B shown in FIG. 7.
Figure 9:
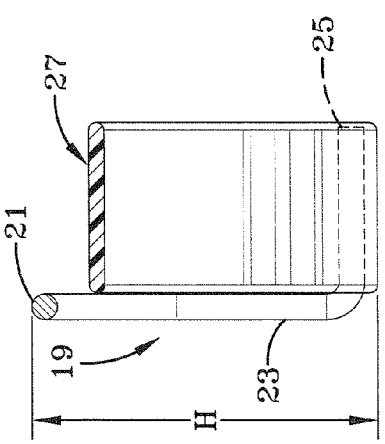
FIG. 9 is a view taken in the direction A-A as shown in FIG. 8.

The inventor has found that for a clip structure made from wire having an outer diameter of 0.23 inch that the length between the outside surface of parallel arm 23 and the free end of retaining arm 25 of clip structure 19, as shown by the distance l in FIG. 10 is 0.77 inch, the total height from the top of curved portion 21 of clip structure 19 to the outer dimension of outer wall 33 of sleeve structure 27 shown by the letter H in FIG. 9 is 1.35 inches, and the distance between the outer surfaces of sleeve structure 27 shown by the letter h in FIG. 8 is 1.23 inches.

Referring to sleeve structure 27, the entire sleeve structure is made of opposing layers 31 and 33 as noted above. The total thickness of these layers when they are contacted, as shown for example where curved surface 39 is located, is preferred to be 0.217 inch. Of course, all of the foregoing dimensions could be modified depending on the components of shower caddy 1 and the respective clip structure and sleeve structure used.

There are various ways in which clip structure 19 could be affixed to support portion 3 of shower caddy 1. In its preferred form, a portion 41 shown in FIG. 7 on a plane about which clip structure 19 is symmetrical at the center of curved portion 21 can be MIG welded in a manner well known in the art.

Although the preferred embodiment of the invention has been described above, it should be understood that the present invention is broader than the preferred embodiment. The invention generally relates to a retaining device for retaining a shower caddy on a shower arm which extends from a wall. The retaining device comprises a clip structure and a sleeve structure. The clip structure includes a shower arm engaging structure configured to engage part of the shower arm and retaining structure extending in a direction transverse to the wall when the shower caddy is hung on a shower arm for cooperating with the sleeve structure. The sleeve structure has a receptacle for receiving the retaining structure to prevent the inadvertent removal of the sleeve structure from the clip structure. The receptacle could be a tubular member, as discussed with respect to the preferred embodiment, but could also be sleeve structure to the clip structure which would prevent the inadvertent removal of the sleeve structure from the clip structure.

Also as noted above, the invention is not limited to shower caddies for attachment to shower arms. It could be used for items such as those used in kitchens, bathrooms, houses in general and numerous commercial environments where an item is to be firmly attached to an elongated member. The elongated member could be cylindrical, but also could have polygonal cross sections, irregular cross sections etc. Although the elongated member could extend horizontally from a support, this is not a requirement.

The invention has been described in detail, with particular emphasis on the preferred embodiment thereof, but variations and modifications within the spirit and scope of the invention may occur to those skilled in the art to which the invention pertains.

I claim:

1. A retaining device for retaining a shower caddy on a shower arm, the shower arm being composed of a cylindrical member for supporting the shower caddy on the shower arm, the retaining device comprising:
   a clip structure comprising:
      a clip structure curved portion configured as an individual inverted U having a clip structure open end portion opposite said clip structure curved portion and being configured for accepting the shower arm, said clip structure curved portion being in an imaginary plane; and
      a retaining structure operatively connected to and extending from said clip structure curved portion and being transverse to said imaginary plane; and
   a sleeve structure made of flexible material having a holding portion for operatively engaging said retaining structure to prevent the inadvertent removal of said sleeve structure from said clip structure, said sleeve structure comprising a sleeve structure curved portion configured as an inverted U for engaging the shower arm to render the shower caddy immobile with respect to the shower arm, said sleeve structure inverted U having a sleeve structure open end portion opposite said sleeve structure curved portion and being configured for accepting the shower arm;
   wherein said sleeve structure inverted U is aligned with said clip structure individual inverted U, and wherein said sleeve structure curved portion is proximal said clip structure curved portion and distal said respective open end portions, said respective open end portions being configured for accepting the shower arm without removal of said sleeve structure from said clip structure.

2. The retaining device according to claim 1 wherein said retaining structure of said clip structure is composed of a pair of retaining arms extending transversely with respect to said imaginary plane, and said holding portion comprises a pair of tubular holding members for slipping around said respective retaining arms to retain said sleeve structure on said clip structure and prevent the inadvertent removal of said sleeve structure from said clip structure.

3. The retaining device according to claim 2 wherein said curved portion of said clip structure has opposing end portions, and said clip structure includes a pair of parallel opposing arms extending from said opposing end portions for being disposed on opposite sides of the shower arm when the shower caddy is placed on the shower arm, and said pair of retaining arms extend from said parallel opposing arms.

4. A retaining device for retaining a shower caddy on a shower arm extending from a flat, vertical wall, the shower arm being composed of a cylindrical member, said retaining device comprising:
   a clip structure configured as an inverted U having a clip structure closed end portion and clip structure open end portion opposite said clip structure closed end portion and being configured for fitting over and slipping on the cylindrical member of said shower arm, said clip structure closed end portion being in an imaginary plane, said clip structure including:
      a shower-arm engaging structure defining said clip structure closed end portion and configured to engage part of the shower-arm; and
      retaining structure defining said clip structure open end portion and composed of cylindrical wires extending in a direction transverse to said imaginary plane when the shower caddy is hung on the shower arm; and
   a plastic sleeve structure including:
      a shower-arm engaging portion having a curved inner surface for operatively engaging the cylindrical member of the shower arm to render the shower caddy immobile on the shower arm;
      a sleeve structure open end portion opposite said shower-arm engaging portion and being configured for fitting over and slipping on the cylindrical member of said shower arm; and
      receptacles in the form of tubes for receiving respectively said cylindrical wires of said retaining structure to prevent the inadvertent removal of said sleeve structure from said clip structure;
   wherein said sleeve structure is aligned with said clip structure, and wherein said sleeve structure shower-arm engaging portion is proximal said clip structure closed end portion and distal said respective open end portions, said respective open end portions being configured for fitting over the cylindrical member of said shower arm without removal of said sleeve structure from said clip structure.

5. A retaining device for retaining an item on a cylindrical elongated member, said retaining device comprising:
   a clip structure having:
      a clip structure curved portion for extending partly around the elongated member, said clip structure curved portion having opposed ends and parallel arms extending from said opposed ends, said parallel opposing arms defining a clip structure open end portion therebetween, said clip structure open end portion being opposite said clip structure curved portion and being configured for accepting the cylindrical elongated member; and a pair of opposing, parallel, retaining arms operatively connected to and extending transversely from said parallel arms; and a sleeve structure made of flexible material and comprising:
   a holding portion for operatively engaging said respective retaining arms to prevent the inadvertent removal of said sleeve structure from said clip structure;
   an elongated member engaging portion comprising a curved inner layer for engaging the cylindrical elongated member to render the item immobile with respect to the cylindrical elongated member; and
   a sleeve structure open end portion opposite said elongated member engaging portion and being configured for accepting the cylindrical elongated member;
   wherein said sleeve structure is aligned with said clip structure, and wherein said sleeve structure elongated member engaging portion is proximal said clip structure curved portion and distal said respective open end portions, said respective open end portions being configured for accepting the cylindrical elongated member without removal of said sleeve structure from said clip structure.

6. The retaining device according to claim 5 wherein said pair of parallel opposing arms are configured for being disposed on opposite sides of the elongated member when the item is placed on the elongated member, and said pair of retaining arms are configured to receive said sleeve structure holding portion, said holding portion being a pair tubular holding members; and
   wherein said sleeve structure further comprises outer layers and inner layers extending from opposite ends of said curved inner layer, said opposing inner layer extensions having opposing protrusions for cooperating with said curved inner layer to expand the ability of said elongated member engaging portion to engage the cylindrical elongated member to render the item immobile with respect to the elongated member.

7. A retaining device for retaining an item on an elongated cylindrical member extending from a vertical wall, said retaining device comprising:
   a clip structure including:
      a clip structure curved portion and a clip structure open end portion opposite said clip structure curved portion and being configured for extending over and partially around the elongated cylindrical member, said clip structure curved portion being in an imaginary plane;
      retaining structure extending in a direction transverse to said clip structure curved portion and transverse to said imaginary plane when the item is hung on the elongated cylindrical member; and
   a sleeve structure for being attached to said clip structure, said sleeve structure having a generally curved plastic elongated cylindrical member engaging portion for engaging the elongated cylindrical member in a firm manner to prevent the inadvertent removal of the item from the elongated cylindrical member, said sleeve structure including:
      a sleeve structure open end portion opposite said generally curved plastic elongated cylindrical member engaging portion and being configured for extending over the elongated cylindrical member; and
      a receptacle for receiving the retaining structure to prevent the inadvertent removal of said sleeve structure from said clip structure;
   wherein said sleeve structure is aligned with said clip structure, and wherein said sleeve structure generally curved plastic elongated cylindrical member engaging portion is proximal said clip structure curved portion and distal said respective open end portions, said respective open end portions being configured for extending over and partially around the elongated cylindrical member without removal of said sleeve structure from said clip structure.

8. The retaining device according to claim 7 wherein said plastic elongated cylindrical member engaging portion comprises a ribbon-shaped body portion.

\* \* \* \* \*